Feb. 7, 1967  J. A. KNUS  3,302,515
PROJECTION APPARATUS OR SYSTEM PROVIDED WITH CONCAVE REFLECTOR
Filed May 15, 1964
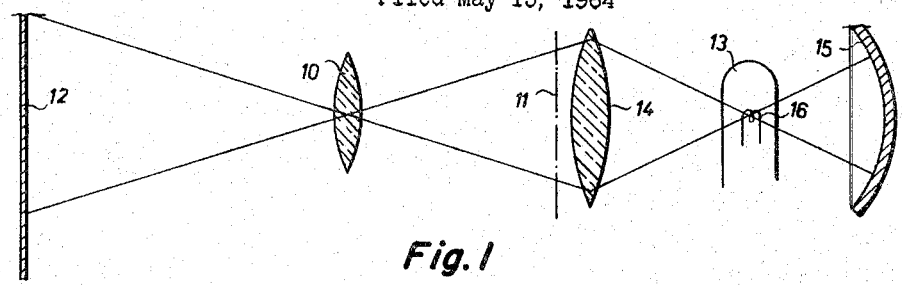
Fig. 1
Fig. 2
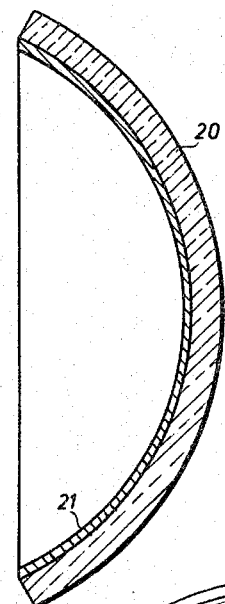
Fig. 3
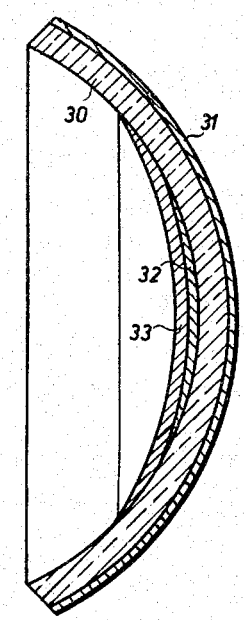
Fig. 4
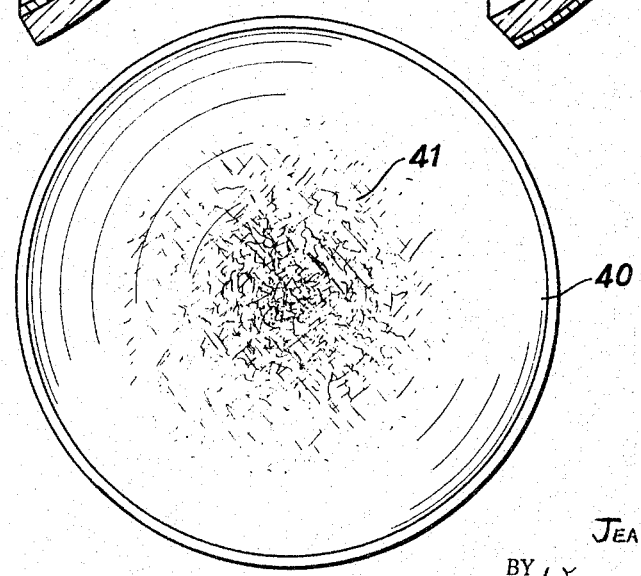
INVENTOR.
JEAN A. KNUS
BY Werner W. Kleeman
His Attorney

United States Patent Office 3,302,515
Patented Feb. 7, 1967

3,302,515
PROJECTION APPARATUS OR SYSTEM PROVIDED WITH CONCAVE REFLECTOR
Jean A. Knus, Zurich, Switzerland, assignor to Alos AG, Zurich, Switzerland, a corporation of Switzerland
Filed May 15, 1964, Ser. No. 367,771
Claims priority, application Switzerland, May 28, 1963, 6,691/63
5 Claims. (Cl. 88—24)

The present invention relates to an improved projection system of the type comprising a projection screen, an objective and an illuminating apparatus incorporating a light source, a condenser and a concave reflector.

It is known that with optical projection via an objective the brightness is in no manner uniformly divided throughout the entire image area or picture field. It is at the greatest in the center of the image and quickly falls off towards the edge as a function $\cos^4 \alpha$ of the aperture angle $\alpha$. This law is not only applicable with the taking of photographs, rather also with projections.

In the reproduction art and also with film projectors the uniform illumination of the image area on the film to be projected therefore represents a considerable problem. Particularly with projectors upon which very high requirements have been made with regard to the uniform illumination of the plane of projection (wall or ground-glass screen) and with the projection of films for the production of enlargements or manuscripts this problem could only be solved up to the present with the aid of relatively complicated devices.

With smaller dimensions of the film to be projected the illumination of the image area was generally carried out by means of a lamp and through the agency of an optical condenser. This condenser must uniformly illuminate the image area or pattern. In fact, for exact work it should illuminate the edge of the image area more strongly in order to compensate for the brightness loss of the objective. However, such can only be achieved with very complicated nonspherical condensers.

In order to increase the light yield of the projection lamp there is generally arranged a spherical mirror (concave mirror) behind the lamp. With the conventional arrangement of the concave mirror the filament spiral or coil of the projection lamp is located at the center of curvature of the mirror. The picture produced from the filament by means of the concave mirror is then likewise located at the center of curvature of the mirror. By means of a slight lateral displacement or turning of the mirror it can be achieved that the reflected light arrives as direct light at the lamp in that it freely passes through the intermediate spaces of the filament spiral and correspondingly increases the light or luminous flux.

The present invention has for one of its primary objects to provide an improved projection system comprising a projection screen, an objective and an illuminating apparatus incorporating a light source, a condenser and a concave reflector.

Another important object of the present invention resides in the provision of an improved projection system which overcomes the disturbing light reduction or decrease towards the edge of the projection screen.

This last mentioned object is achieved in accordance with the invention in that the reflection capability of the concave mirror or reflector is reduced from the outside towards the center of the mirror.

Other features, objects and advantages of the invention will become apparent by reference to the following detailed description and drawings in which:

FIGURE 1 schematically illustrates a projection system designed according to the present invention;

FIGURE 2 is an enlarged cross-sectional view through a first embodiment of concave reflector of the projection system of FIGURE 1;

FIGURE 3 is an enlarged cross-sectional view through a second embodiment of concave reflector; and FIGURE 4 illustrates an enlarged front view of still a further form of concave reflector.

Describing now the drawings, the projection system depicted in FIGURE 1 comprises an objective 10 with the aid of which a transparent picture or written object or pattern 11 is to be optically reproduced upon a projection or picture screen 12 belonging to the projection system. For this purpose the pattern or object 11 must be illuminated with an illuminating device which, in the present instance, incorporates an electric light source 13, an optical condenser 14 and a spherical concave mirror or reflector 15. The filament spiral or coil 16 of the light source 13 is located at the focal point of the concave reflector or mirror 15. Characteristic of the described projection system is that the reflecting capability or capacity of the concave mirror 15 is not constant throughout its entire surface, rather falls off from the outside towards the center of the mirror.

In accordance with the embodiment of FIGURE 2 the non-uniform reflecting capacity of the hollow mirror is achieved in the following manner: A portion of the interior of a hollow sphere, generally designated by reference numeral 20, and formed of glass, is provided at its concave side with a reflecting metal lining or covering 21, the thickness of which gradually decreases from the edge or periphery of the concave mirror 20 towards the center of the same until practically reaching zero value. A portion of the light emanating from the filament spiral 16 can pass through the surface portions of the mirror coating 21 possessing smaller thickness, whereby the passed portion of the light cannot be reflected towards the condenser 14 by means of the coating 21. Consequently, the reflecting capability or capacity of the concave mirror 20 decreases with decreasing thickness of the reflecting coating 21.

During the production of the reflecting coating 21 such can either be produced by means of a vapor coating technique taking place in a vacuum and at the same time with the desired decrease in thickness, or else, can initially be formed with continuous uniform thickness and thereafter worked by means of a grinding and polishing operation.

In the embodiment depicted according to FIGURE 3 a reflecting coating 31 possessing continuous uniform thickness is applied at the convex rear face or side of a portion of a hollow sphere 30 formed of glass. In order to reduce the reflecting capability of the concave mirror or reflector towards its center the central portion of the concave side of such reflector is provided with a coating or covering 32, 33 absorbing the light, the thickness of which decreases from the inside towards the outside. The aforesaid coating or covering 32, 33, in accordance with the embodiment of FIGURE 3, comprises two superimposed circular-shaped layers 32 and 33 possessing different diameters. The lower layer 32 of smaller diameter consists of black coloring matter and absorbs the larger portion of the light impinging thereon. The upper layer 33 facing towards the light source 13 is formed of a dull or mat coloring substance which allows a portion of the light to pass therethrough.

The formation of the layers 32, 33 can take place in the following matter: A black heat-resisting coloring material is sprayed onto the concave side or face of the mirror through an apertured partition erected in front of the concave mirror, whereby there results the circular layer 32 possessing reduced thickness towards the outside. The reduction of the layer thickness towards the periphery can be changed by selecting the spacing of the apertured partition or diaphragm from the mirror or reflector. Afterwards, with the same arrangement there is sprayed a weak transparent coloring substance upon the concave reflector and the first layer 32 in order to form the second layer 33 possessing larger diameter, whereby there again results a layer thickness which decreases towards the outside.

The concave reflector depicted in front view in FIGURE 4 exhibits at its concave face or side, which is to be turned towards light source 13, a reflecting metal layer which is increasingly matted or dulled towards the center of the reflector, as generally indicated at 41. Due to the matting or dulling 41 there is achieved that the reflection capacity of the reflector gradually decreases towards the center.

In all of the aforementioned illustrative embodiments the reflecting coating can consist of an optional substance known for this purpose, as for example silver, aluminum and so forth. With the described non-uniform distribution of the reflection or reflecting capacity or capability of the concave reflector there is achieved that the pattern or area 11 is completely uniformly illuminated, or, in fact, is more brightly illuminated towards its edges than at its central region in such a manner that the illumination of the projection screen 12 is completely uniform throughout its entire surface.

While there is shown and described present preferred embodiments of the invention it is to be distinctly understood that the invention is not limited thereto but may be otherwise variously embodied and practised within the scope of the following claims.

What is claimed is:

1. Projection system comprising a projection screen, an objective and an illuminating apparatus, said illuminating apparatus incorporating a light source, a condenser and a concave reflector, said concave reflector being provided with means modifying the reflection capability thereof such that it gradually decreases from the outside towards the center of said concave reflector, said modifying means comprising a reflecting metal covering which reduces in thickness towards the center of said concave reflector.

2. Projection system comprising a projection screen, an objective and an illuminating apparatus, said illuminating apparatus incorporating a light source, a condenser and a concave reflector, said concave reflector being provided with means modifying the reflection capability thereof such that it gradually decreases from the outside towards the center of said concave reflector, said means modifying the reflection capability of said concave reflector including a partially light absorbing covering provided at the concave central portion of said concave reflector, the thickness of which decreases towards the outside of said concave reflector.

3. Projection system as defined in claim 2 wherein said light absorbing covering comprises two superimposed circular-shaped layers possessing different diameters.

4. Projection system as defined in claim 3 wherein the layer possessing larger diameter is directed towards said light source and is partially permeable for light.

5. Projection system as defined in claim 2, wherein said modifying means further includes a reflecting metal covering located rearwardly of said partially light absorbing covering with respect to said light source.

References Cited by the Examiner

UNITED STATES PATENTS

| | | | |
|---|---|---|---|
| 1,665,660 | 4/1928 | Foster | 88—24 |
| 2,117,737 | 5/1938 | May | 88—24 |
| 2,308,009 | 1/1943 | Hood et al. | 240—46.07 X |
| 2,309,788 | 2/1943 | Ramberg | 88—24 |
| 2,356,694 | 8/1944 | Potter et al. | 88—24 X |
| 2,384,578 | 9/1945 | Turney | 88—108 |
| 2,415,635 | 2/1947 | Hopkins | 88—24.27 X |
| 2,751,816 | 6/1956 | Strong | 88—73 |
| 3,184,585 | 5/1965 | Rouy | 88—24 X |

NORTON ANSHER, *Primary Examiner.*

V. A. SMITH, R. A. WINTERCORN,
*Assistant Examiners.*